Dec. 27, 1927.
L. ROEBEL
1,653,784
WINDING FOR ELECTRICAL MACHINES
Filed April 16, 1927
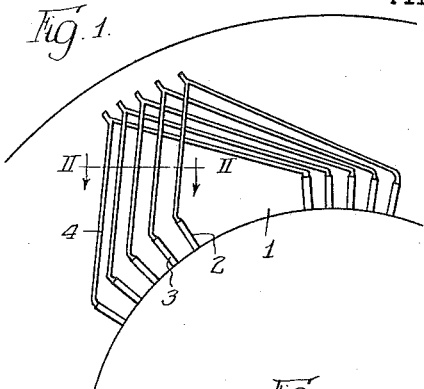
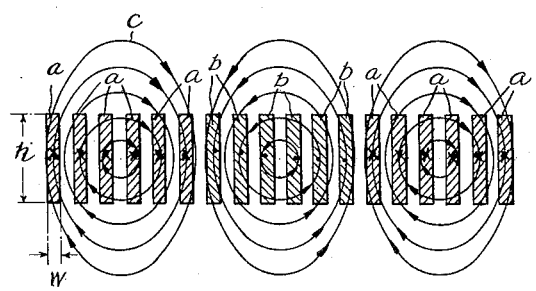
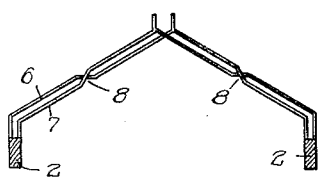
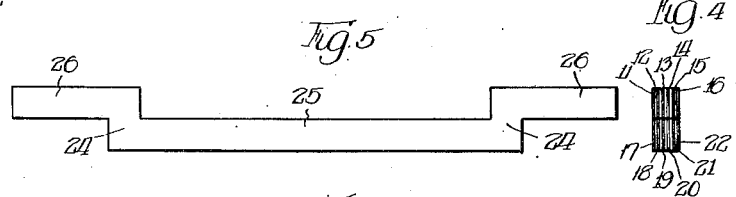
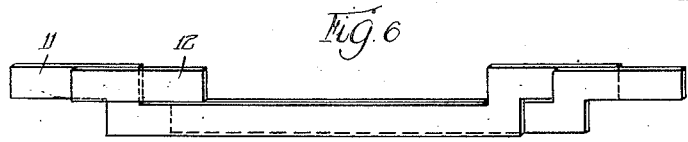
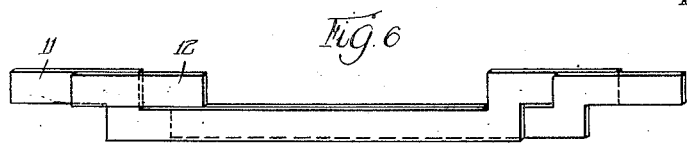
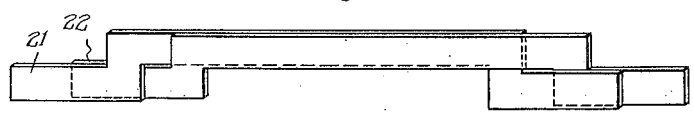
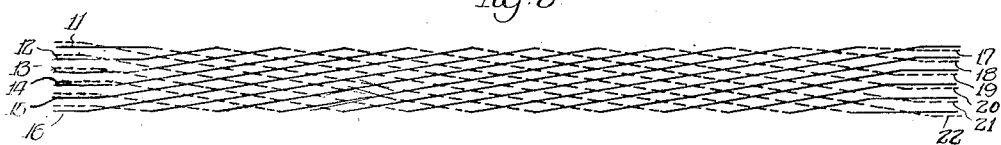
Inventor:
Ludwig Roebel,
By Cromwell, Greist & Warden
attys.

Patented Dec. 27, 1927.

1,653,784

UNITED STATES PATENT OFFICE.

LUDWIG ROEBEL, OF MANNHEIM, GERMANY.

WINDING FOR ELECTRICAL MACHINES.

Application filed April 16, 1927, Serial No. 184,411, and in Germany December 22, 1922.

This invention relates to windings for electrical machines and it has particular relation to the construction of the coil heads or connectors interconnecting spaced bars of coils disposed in slots on the periphery of dynamo-electric machines, and the like.

Among the objects of the invention is the provision of improved windings for such machines characterized by the fact that the winding connectors or heads are made of stranded conductors in order to prevent unequal distribution of the current over the section of the conductor by reason of the leakage flux interlinked with the winding heads. According to the invention, the interconnecting conductors are subdivided in the direction in which successive connectors follow each other, that is, in the direction along the circumference or periphery of the machine, the component conductors being twisted or transposed in such way that each component element of the connector has substantially the same interlinkage with the leakage flux.

The invention will be best understood from the accompanying drawings, wherein

Fig. 1 is an elevational view of a portion of a dynamo-electric machine illustrating a plurality of coil sides with winding heads or connectors extending therebetween;

Fig. 2 is a sectional view along the lines II—II of Fig. 1 illustrating the leakage flux conditions adjacent the winding heads;

Fig. 3 is a view similar to Fig. 1 illustrating a winding head embodying the invention;

Fig. 4 is a sectional view through a conductor utilized to constitute a winding head of preferred construction;

Fig. 5 is a plan view of a strip or component conductor utilized to make the preferred winding heads; and Figs. 6 to 8 illustrate steps in the construction of a winding head conductor from component conductor elements or straps shown in Fig. 5.

In order to eliminate unequal current distribution in conductors of large cross section embedded in slots of dynamo-electric machines such conductors are subdivided into a plurality of component conductor elements which are transposed or twisted so that each conductor element passes through every portion of the section occupied by the conductor in the slot. With such arrangement each of the conductor elements has substantially the same interlinkage with the leakage flux through the slot, and accordingly the total voltage induced in each conductor element is equal, eliminating the flow of equalizing or eddy currents between different elements of the conductor. It is, of course, important that the individual conductor elements be insulated from each other since otherwise the transposition of the individual strands or conductor elements would be of little or no effect. In large machines rectangular conductors have to be almost exclusively used because they permit best utilization of the space and avoid clumsy end connectors.

Conductors or bars of large cross section constituting windings embedded in slots of dynamo-electric machines are exposed to a leakage flux through the slot which tends to induce eddy currents in the solid conductors, producing as a result unequal distribution of the current in the section of the conductor. In the case of ordinary dynamo-electric machines the leakage flux varies with the radial depth of the slot, the portions of the conductor disposed at the bottom of the slot being interlinked with a greater flux than the portions near the top of the slot. To avoid this difficulty the conductor within the slot has been divided in the direction of the slot depth into a plurality of strands or component conductor elements, the individual strands being twisted or transposed and crossed so that each component conductor element occupies successively every position of the height of the conductor bar.

I have found that in machines carrying heavy currents difficulties of a similar nature are encountered by reason of the unequal current distribution over the cross section of the bars constituting the connectors or heads interconnecting the coil sides disposed in peripherally spaced slots of the machine. Said connectors or winding heads usually extend at the two ends of the machine in planes substantially parallel to the machine axis, the connectors from successive bars of the winding following each other successively, or in some other sequence, depending on the type of the winding.

The currents flowing in said connector bars induce a leakage flux which has an effect similar to that of the leakage flux in the slot, tending to distribute the current unequally over the section of the individual bars. The leakage flux in the slots of dynamo-electric machines extends principally in the direction transverse to the slot and therefore tends to produce current displacement in the direction of the slot depth. Accordingly in providing transposed slot conductors the subdivision is made in the direction of the conductor height, that is, the slot depth, and the transposition is effected with a view to bringing each conductor element through each portion of the height of the bar.

In distinction from the conditions in the slots, the leakage flux at the winding heads or connectors extends principally in the direction of the conductor height, that is, in the direction of the axis of the machine or the axis of the slots. As a consequence, the current displacement in the individual bars takes place in a direction of the width of the bars, as distinguished from the direction along the height of the bars in the case of the portions embedded in the slots. According to my invention, the bars constituting the winding connectors are, therefore, divided into a plurality of component bar elements or strands in the direction of the bar width, and the several bar sections are transposed to occupy all the portions of the width of the bar.

This will be best understood from the drawing which illustrates my invention as applied to a winding of a dynamo-electric machine comprising an armature core 1 having a plurality of slots 2 distributed along the circular periphery thereof. The type of winding here under consideration is intended to carry large currents and comprises rectangular bars 3 of large cross section embedded in the slots 2, suitable bars being connected by winding heads or connectors 4 of familiar shape to constitute the coils of the winding. The connectors extend along the periphery of the core from bar to bar and form layers on both ends of the machine, said layers being substantially parallel to the ends of the core.

The leakage flux induced by the currents in the winding heads or connectors is shown in Fig. 2 which is intended to represent the case of a single-phase machine although similar conditions prevail with machines of other types, such as polyphase machines. The winding has six connectors $a$, carrying current in one direction, indicated by a cross in the conductor, followed by six connectors $b$, carrying current in opposite direction, indicated by dots, and so on. The lines of force of the leakage field induced by the currents will have the shape indicated by the closed lines $c$. The flux has greatest density at the points where the direction of the current flow in the connectors reverses and the flux has, in general, a direction parallel to the height of the bars, that is, in a direction perpendicular to the width $w$ of the bars or the direction of the layer formed by the successive connectors. Accordingly, the portions of the individual conductors will vary in the amount of interlinkage with said leakage flux in the direction of the width of the conductors, tending to produce unequal current distribution in the direction of said conductor width $w$, or in the direction of the layer constituted by the winding heads.

In order to avoid the foregoing unequal current distribution in the winding heads, I subdivide each connector bar in the direction of the width $w$ thereof into a plurality of conductor elements or strands that are insulated from each other and the individual elements of each conductor are transposed so that each strand occupies each portion of the width of the conductor. Such an arrangement is shown in Fig. 3 wherein the connector bar is subdivided into two strands 6 and 7, which are transposed or crossed at two points 8 as shown. The bars constituting the coil sides 2 are also subdivided, and the individual connector elements are soldered or otherwise joined at their ends and suitably united to the coil side bars.

A simple and effective construction is secured by utilizing for the connectors the type of conductor disclosed in my Patent No. 1,144,252 granted June 22, 1915 and assigned to Brown, Boveri & Cie. The conductor of said patent is particularly suitable for forming connectors of relatively great height and small width and in which the width of the conductor is divided into a plurality of sections that are transposed so as to successively pass through all portions of the width of the conductor. The construction provides also for one subdivision in the direction of the height thus counteracting any tendency to produce unequal current displacement in the direction of the height of the connector bars by reason of unequal distribution of the leakage field in said direction.

In Figs. 4 to 8 there is shown such subdivided connector bar composed of two sets of six strands each, there being six transpositions in the direction of the width of the bar and one transposition in the direction of the height thereof.

As explained in said patent, the rectangular conductor is made up of a plurality of strands such as shown in Fig. 5, in the present instance of 12 such strands 11 to 22. Each strand has the form of a flat conducting bar or strip having a central portion offset by an amount approximately equal to the height of the strip, as clearly illustrated in Fig. 5, there being two bent or cranked portions 24 connecting the offset part 25 of the strip with the two end portions 26 thereof. In the case of the conductor shown in Figs. 4 to 8 six such strips are first assembled into one group in the manner illustrated in Fig.

6, successive strips being interleaved so that the end portions of the second strip pass in front of the end portions of the first strip while the offset portion lies behind the offset portion of the first strip. The third strip is similarly arranged so that its end portions lie in front of the end portions of the second strap while the offset portion lies behind the offset portion of the second strap, and so on. Six conductors 11 to 16 are thus assembled into a group, the general arrangement appearing clearly from Fig. 8 where said conductors are indicated by the heavy lines. A second group of six conductors 17 to 22 is similarly assembled as shown in Fig. 7, said second group being turned 180 degrees against the group shown in Fig. 6. The two groups are thereupon placed over each other so that the offset portion of one group fits into the depression formed by the offset portion in the other group, as indicated in Fig. 8.

With the foregoing arrangement the individual conductors hold each other interlocked and do not require special means for holding the same together. Each strand passes through every portion of the width of the conductor and there is also a transposition in the direction of the conductor height. The construction of the conductor illustrated in Figs. 4 to 8 may be modified in various ways, for instance, the number of component strips may be varied and more than two groups may be used. Furthermore, the cranking of the individual conductors may be effected at any desired angle.

I claim:

1. In an electric machine having an armature provided with a plurality of axially disposed slots, windings in said slots comprising bars disposed in the slots, and connectors connecting said bars at the ends of the slots, said connectors comprising substantially rectangular bars substantially uniform in cross-sectional area throughout their length, said connecting bars being composed of a plurality of strands subdividing the bars in the direction of the width thereof in a plane perpendicular to the axes of the slots, the strands interfitting with respect to each other so as to occupy different positions of the width of the connecting bar they comprise while providing for such uniformity of cross-sectional area of the latter.

2. In an electric machine having an armature provided with a plurality of axial slots, a winding comprising bars disposed in said slots, and connectors interconnecting said bars at the ends of the slots, said connectors comprising bars substantially uniform in cross-sectional area throughout their length and subdivided in the direction of their width into a plurality of strands, the individual strands interfitting with respect to each other to occupy different positions in the width of the connecting bar they comprise while providing for such uniformity of cross-sectional area of the latter.

3. In an electric machine, a coil having straight substantially parallel coil sides, and connectors connecting the ends of said coil sides, said connectors comprising bars each substantially uniform in cross-sectional area throughout its length and subdivided into a plurality of strands, said strands interfitting with respect to each other in such manner that each strand passes through all the positions of the width of the bar they comprise while providing for such uniformity of cross-sectional area of the latter, the individual strands being insulated from each other to suppress a flow of eddy currents therebetween.

4. In an electric machine, a coil comprising a pair of substantially parallel conducting bars constituting two sides of a coil and a coil head interconnecting said coil sides, the conductor constituting said coil head comprising a bar having a plurality of groups of flat strands transposed in the direction of the width of the bar to pass through all the portions of said width, said strands having crankings and offset portions so interlinked with each other that a strand in one portion of the width of the bar passes through one of the crankings to another portion of the width of the bar and then returns through another cranking to the portion of the width which it occupied before passing through the first cranking.

5. In an electric machine having an armature provided with a plurality of axial slots, a winding comprising bars disposed in said slots and connectors interconnecting said bars at the ends of the slots, said connectors comprising a number of metallic strips each with two crankings, one toward one edge of the strip and the other away from that edge, the strips forming one-half of the connector being assembled in such a manner that a group is formed wherein the connector which is at the bottom or side at one end passes by way of the top or other side at one cranking to the bottom or original side at the next cranking, the strips forming the other half of the connector being similarly assembled, one-half being turned through 180 degrees and the two halves then assembled to interlock.

6. In an electric machine, a coil having straight substantially parallel coil sides and winding heads connecting the ends of said coil sides, the conductor constituting said winding heads comprising a number of metallic strips of constant width throughout their length and each provided with two crankings, one toward one edge of the strip and the other away from that edge; the strip being disposed at right angles to the crankings and with the crankings evenly displaced in adjacent strips in each half of the conductor, the two halves of the conductor being relatively turned through 180 degrees and assembled.

7. In an electric machine, a coil comprising a pair of substantially parallel conducting bars constituting two sides of a coil and a coil head interconnecting said coil sides, the conductor constituting said coil head comprising a metal strip having a portion extending in a straight line, a right angle offset formed therein, a diagonal bend at said offset inclining a portion of said strip away from the straight line portion, a second right angle offset formed in the strip, a second diagonal bend at said offset and a further straight line portion on the same plane as the first mentioned straight line portion, substantially as described.

8. In a dynamo-electric machine, an open-ended coil, and a plurality of complementary conducting elements each providing a connection between the ends of said coil and interfitting with each other to form a single connecting bar for said ends, said elements being so arranged with respect to each other that each occupies all portions of the width of said bar of which it is a part.

9. In a dynamo-electric machine, an open-ended coil, and a plurality of complementary elongated conducting elements each providing a connection between certain of the ends of said coil and interfitting with each other to form a single connecting bar for said ends, each of said elements being provided intermediate its ends with an offset portion traversing the entire width of said bar and providing for the interfitting relation of said elements with respect to each other.

In testimony whereof I have hereunto subscribed my name this 1st day of April A. D. 1927, at Stuttgart, Germany.

LUDWIG ROEBEL.